United States Patent
Weber et al.

(10) Patent No.: US 7,668,630 B2
(45) Date of Patent: Feb. 23, 2010

(54) REGULATING STRATEGY FOR ELECTROMECHANICALLY POWER-BRANCHING HYBRID DRIVES

(75) Inventors: Nicole Weber, Schwieberdingen (DE); Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 623 days.

(21) Appl. No.: 10/566,127

(22) PCT Filed: May 24, 2004

(86) PCT No.: PCT/EP2004/050903
§ 371 (c)(1), (2), (4) Date: Jun. 16, 2006

(87) PCT Pub. No.: WO2005/009770
PCT Pub. Date: Feb. 3, 2005

(65) Prior Publication Data
US 2006/0243502 A1  Nov. 2, 2006

(30) Foreign Application Priority Data
Jul. 25, 2003 (DE) ................................. 103 33 931

(51) Int. Cl.
*B60K 6/22* (2007.10)
(52) U.S. Cl. .................. 701/22; 180/65.265; 180/65.8
(58) Field of Classification Search .......... None
See application file for complete search history.

(56) References Cited

U.S. PATENT DOCUMENTS

| | | | |
|---|---|---|---|
| 6,328,671 B1 * | 12/2001 | Nakajima et al. | 477/46 |
| 7,101,308 B2 * | 9/2006 | Joe et al. | 477/3 |
| 2002/0024306 A1 | 2/2002 | Imai et al. | |
| 2002/0113440 A1 | 8/2002 | Abe et al. | |
| 2003/0060948 A1 | 3/2003 | Gotou et al. | |

FOREIGN PATENT DOCUMENTS

| | | |
|---|---|---|
| DE | 198 42 452 | 4/1999 |
| DE | 199 03 936 | 5/2000 |
| DE | 199 09 424 | 8/2000 |
| DE | 100 62 556 | 7/2002 |
| EP | 1 270 301 | 1/2003 |
| JP | 2000-032611 | 1/2000 |
| JP | 2000-324615 | 11/2000 |

(Continued)

*Primary Examiner*—Michael J. Zanelli
(74) *Attorney, Agent, or Firm*—Kenyon & Kenyon LLP

(57) ABSTRACT

A method for regulating an electromechanically power-splitting hybrid drive system of a motor vehicle, having an internal combustion engine and two electric motors that are coupled by way of a transmission, as well as an electromechanically power-splitting hybrid drive system for a motor vehicle. It is proposed that, based on coupling conditions of the transmission, respective target rotation speeds and target torques be calculated for the internal combustion engine and the two electric motors; that the respective target rotation speeds be compared with corresponding actual rotation speeds of the internal combustion engine and of the electric motors; and that in the case of a system deviation between one of the actual rotation speeds and the corresponding target rotation speed, one or more additional torques be calculated on the basis of the system deviation and be taken into account, in addition to the target torque or torques calculated by the control system, in controlling the torque of the internal combustion engine and of the two electric motors.

9 Claims, 1 Drawing Sheet

FOREIGN PATENT DOCUMENTS

| | | | |
|---|---|---|---|
| JP | 2000-333304 | | 11/2000 |
| JP | 2001-317385 | | 11/2001 |
| JP | 2002-159105 | * | 5/2002 |
| JP | 2002-165305 | | 6/2002 |
| JP | 2004-66840 | * | 3/2004 |
| WO | WO03049965 | | 6/2003 |

* cited by examiner

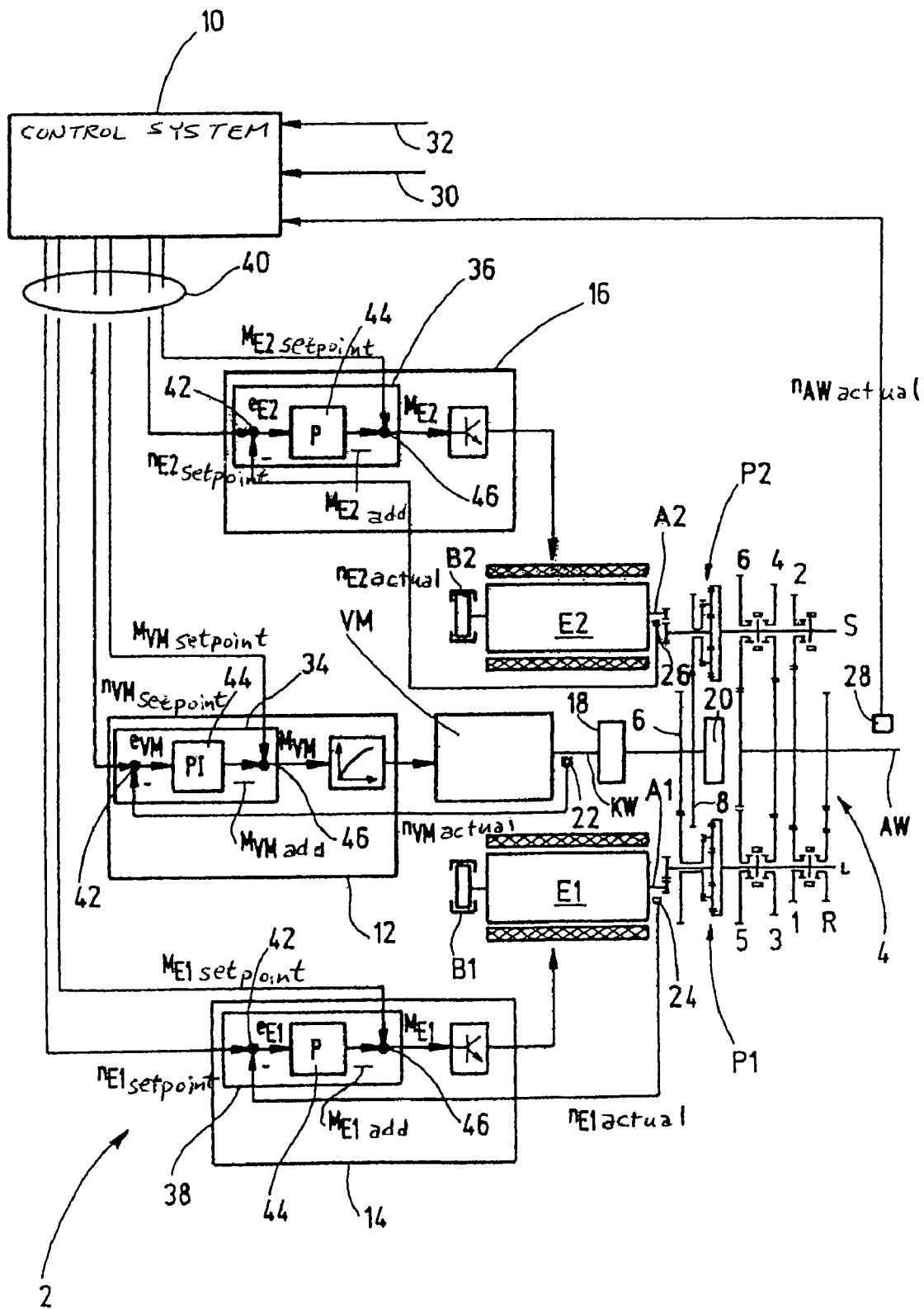

REGULATING STRATEGY FOR ELECTROMECHANICALLY POWER-BRANCHING HYBRID DRIVES

FIELD OF THE INVENTION

The invention concerns a method for regulating an electromechanically power-splitting hybrid drive system of a motor vehicle having an internal combustion engine and two electric motors that are coupled by way of a downstream transmission, as well as an electromechanically power-splitting hybrid drive system for a motor vehicle.

BACKGROUND INFORMATION

Whereas known manually shifted and automatic transmissions for motor vehicles have stepped drive ratios and therefore do not allow the internal combustion engine to be operated in the range of high efficiencies in every driving situation, this problem can be eliminated by an electromechanically power-splitting hybrid drive system. Hybrid drive systems of this kind are disclosed, for example, in German Published Patent Application No. 198 42 452 (Toyota hybrid system), German Published Patent Application No. 199 03 936 (Dual-E transmission) or German Published Patent Application No. 199 09 424 (SEL 120/3 transmission). All these drive systems possess, in addition to the internal combustion engine, two electric motors that constitute an electrical actuating gear drive. The internal combustion engine and the electric motors are coupled by way of a downstream mechanical transmission having planetary stages, in which transmission the drive power of the internal combustion engine is divided into two power components. Whereas the one power component is transferred mechanically, and thus at high efficiency, to the transmission output shaft and thus to the motor vehicle's wheels, the other power component is converted into electrical power by the one electric motor in generator mode, and fed back into the transmission by the other electric motor in motor mode.

In drive systems of this kind, an additional starter and generator can be dispensed with. The electric motors start the internal combustion engine and generate the electrical power necessary for an electrical system of the motor vehicle that encompasses an energy reservoir for the electrical power that is generated. Also possible, in addition to a hybrid mode in which both the internal combustion engine and the electric motors operate, is a boost mode and a purely electrical driving mode; in the latter, electrical power is taken from the energy reservoir.

In hybrid mode, the decoupling of the rotation speeds of the two electric motors results in one rotation speed degree of freedom; this means that for a specified vehicle speed and therefore a specified rotation speed at the transmission output shaft (and for a specified gear ratio, in the case of the SEL or Dual-E transmission), the rotation speed of one of the two electric motors can be selected without restriction (within physical limits). The rotation speed of the second electric motor and the rotation speed of the internal combustion engine are then determined by the coupling conditions of the downstream transmission. This rotation speed degree of freedom is used to operate the drive train in the range of high efficiencies. A control system of the motor vehicle substantially takes into account its speed and the actual rotation speed of the transmission output shaft, as well as the mechanical power requested by the driver (accelerator pedal position) and the electrical power needed to supply the vehicle's electrical system, and on the basis of these parameters defines the rotation speed degree of freedom that is present, as well as the torques of the three drive units.

With the known methods for regulating a drive system of this kind having one rotation speed degree of freedom, one of the electric motors is operated in rotation-speed-regulated fashion, while the internal combustion engine and the other electric motor are torque-controlled, or the latter is torque-regulated in the case of an electric motor having a current regulator or field-oriented regulation system. In other words, a control system of the motor vehicle drive system specifies the target rotation speed of the rotation-speed-regulated electric motor, the target torque of the torque-controlled electric motor, and the target torque of the torque-controlled internal combustion engine. The two torque-controlled drive units influence not only the torque at the transmission output shaft but also the torque that occurs at the rotation-speed-regulated drive unit or is set there by a rotation speed controller of that unit, and is specified as the target value for its subordinate current regulation system. Ideally, this torque corresponds to a target torque, calculated in advance in the control system, for the rotation-speed-regulated electric motor.

With the known method, however, inaccuracies present especially in the torque control actions in the internal combustion engine, and inaccuracies in the friction conditions of the transmission, have an effect on the rotation-speed-regulated electric motor, with the result that the torque established at that electric motor by the rotation speed controller can deviate considerably from the target torque calculated in advance in the control system.

Certain negative effects result therefrom. On the one hand, in such a case the electrical power of the rotation-speed-regulated electric motor also deviates from the target value. The electrical power fed into the electrical system then does not correspond to the control system's specification, thus negatively affecting the electrical system. In addition, the power limits of the electrical energy reservoir can also be exceeded, e.g. in the context of energy recovery during a braking operation or in boost mode. On the other hand, inaccuracies can cause the rotation-speed-regulated electric motor to arrive at its maximum torque limit, which is equivalent to a limitation of the manipulated variable for the rotation speed control loop. The link established with the rotation speed regulation system thereby becomes ineffective. Without further interventions on the torque-controlled second electric motor or the torque-controlled internal combustion engine, control of the system becomes lost.

In dynamic mode, the torque-controlled drive units can be pilot-controlled based on a knowledge of the inertias that need to be compensated for. Additional inaccuracies may nevertheless be expected in this context, with effects in turn on the torque of the rotation-speed-regulated electric motor.

SUMMARY OF THE INVENTION

The electromechanically power-splitting hybrid drive system according to the present invention and the method for regulating it, have the advantage, in contrast, that the task of rotation speed regulation is distributed among all the units, i.e. the internal combustion engine, the first electric motor, and the second electric motor, in order to eliminate the disadvantages described above. With the features according to the present invention, inaccuracies in the friction conditions of the transmission and inaccuracies when controlling the torque of the internal combustion engine are taken into account, and their effects on the electrical power fed into the vehicle's electrical system are minimized.

In addition, there is much less risk of losing control of the system as a consequence of manipulated variable limitations. Further advantages include active damping of undesired rotational oscillations of a drive train of the drive system. The method according to the present invention can moreover advantageously be carried out using an ordinary control device structure in which each of the three drive units has a control device associated with it, e.g. an engine control device for the internal combustion engine and one inverter with controller for each of the two electric motors, and in which the control devices communicate with one another via a bus connection.

Because the specified target torque is implemented with sufficient accuracy in modern electric motors, whereas greater deviations between the target torque and the actual torque generated at the crankshaft usually occur in the case of the internal combustion engine, a preferred embodiment of the invention provides for an I, PI, or PID controller to be used as the rotation speed controller for the internal combustion engine, whereas P or PD controllers are used as rotation speed controllers for the electric motors.

According to an advantageous embodiment of the invention, the rotation speed controllers each constitute part of a decentralized rotation speed control loop of the internal combustion engine and the electric motors respectively, which are implemented in the control devices of the individual units and are not connected via a bus system, so that long signal transit times are avoided and high bandwidths can thereby be attained. For specification of the target torques and target rotation speeds from the control system to the control devices, on the other hand, it is advantageous to use a bus system that is usually present in modern motor vehicles.

The controller parameters of the rotation speed control loops, and initialization of an integral component of the rotation speed control loop of the internal combustion engine, are preferably also specified by the control system, with the result that the regulation behavior and active rotational oscillation damping can be adapted to the particular operating state of the drive train. It is thus possible to separately consider and optimize, for example, starting and stopping operations of the internal combustion engine, which involve transition through a resonant frequency imposed by its two-mass flywheel, with no need to modify the controller structure.

In most operating states of the hybrid drive system, one of the two electric motors works as a motor while the other works as a generator. By suitable specification of controller parameters adapted to the operating state, the effects of controller interventions on the electrical power fed into the vehicle's electrical system can be minimized.

At a specified vehicle speed and therefore a defined actual rotation speed at the transmission output shaft, one rotation speed degree of freedom exactuals in the transmission. If there is a risk of distributing the system of three rotation speed control loops, for example as a consequence of inaccuracies or time delays in sensing rotation speeds, bandpass filters (not depicted) can be provided on one or two rotation speed control loops before or after the rotation speed controller, in order to limit the controller intervention to the frequency range of the undesired drive train rotational oscillation. If manipulated variable limitations or large system deviations appear imminent, the control system should cancel the effect of the bandpass filters so that all the units are utilized to maintain the rotation speed link.

BRIEF DESCRIPTION OF THE DRAWING

The FIGURE schematically depicts a hybrid drive system for a motor vehicle with an associated control strategy.

DETAILED DESCRIPTION

The electromechanically power-splitting hybrid drive 2 of a motor vehicle, said drive being depicted in the drawings and embodied as a so-called Dual-E transmission, substantially encompasses three drive units in the form of an internal combustion engine VM and two electric motors E1 and E2; two planetary stages P1 and P2, downstream from electric motors E1 and E2, which are coupled via a multi-stage mechanical three-shaft shiftable transmission 4 to a transmission output shaft AW leading to the wheels of the motor vehicle, and via two gears 6 and 8 to a crankshaft KW of internal combustion engine VM; a shared control system 10 for all three drive units VM, E1, E2; and separate control devices for internal combustion engine VM and the two electric motors E1, E2, in the form of an engine control system 12 and two inverters 14 and 16, respectively. Crankshaft KW of internal combustion engine VM is connected via a two-mass flywheel 18 to the two gears 6 and 8. A freewheel 20 stabilizes the torques of electric motors E1 and E2 when driving electrically, i.e. when internal combustion engine VM is shut off, and prevents any backward rotation of internal combustion engine VM. Located in the vicinity of crankshaft KW is a rotation speed sensor 22 that measures the actual rotation speed $n_{VM\,actual}$ of crankshaft KW and delivers it as an input variable to motor control device 12.

Drive shafts A1 and A2 of the two electric motors E1 and E2 are each equipped with a brake B1 and B2 for mechanical braking of drive shafts A1 and A2, respectively. Located in the vicinity of drive shafts A1 and A2 is a respective rotation speed sensor 24 and 26 that measures the actual rotation speed $n_{E1\,actual}$ and $n_{E2\,actual}$ of drive shafts A1 and A2, respectively, and delivers it as an input variable to the corresponding inverter 14 and 16.

A further rotation speed sensor 28 disposed in the vicinity of transmission output shaft AW ascertains the latter's actual rotation speed $n_{AW\,actual}$ and forwards it to control system 10 (not described further) which receives as further input variables, in addition to the actual rotation speed $n_{AW\,actual}$ of transmission output shaft AW or alternatively the rotation speed of the wheels, at 30 the position of the accelerator pedal as an indication of the drive system power being requested, and at 32 the electrical power requested by an electrical system of the motor vehicle.

From these input variables and on the basis of the coupling conditions of transmission 4, control system 10 calculates the target rotation speeds $n_{VM\,setpoint}$, $n_{E1\,setpoint}$, $n_{E2\,setpoint}$ and target torques $M_{VM\,setpoint}$, $M_{E1\,setpoint}$, $M_{E2\,setpoint}$ of internal combustion engine VM and electric motors E1 and E2. Target torques $M_{VM\,setpoint}$, $M_{E1\,setpoint}$, $M_{E2\,setpoint}$ can contain components to compensate for inertias in the context of dynamic operation. As described below, the target torques $M_{VM\,setpoint}$, $M_{E1\,setpoint}$, $M_{E2\,setpoint}$ are used for pilot control by three subordinate decentralized rotation speed control loops in motor control device 12 and in the two inverters 14, 16, and in the context of a cascaded manipulated variable limitation, fall within the limits of the maximum torque of the respective unit VM, E1, E2 in order to provide manipulation reserves for rotation speed controllers 34, 36, 38 of the rotation speed control loops.

A bus system 40 present in the motor vehicle is used to specify the target torques and target rotation speeds from control system 10 to motor control device 12 and to the two inverters 14, 16. Rotation speed controllers 34, 36, 38 themselves, however, are not connected via a bus system, so that long signal transit times can be avoided and high bandwidths can be attained.

Rotation speed controllers 34, 36, 38 in motor control device 12 and in the two inverters 14, 16, respectively, each encompass a comparison element 42 that receives as an input variable from the respective rotation speed sensor 22, 24, 26 the respective actual rotation speeds $n_{VM\ actual}$, $n_{E1\ actual}$, $n_{E2\ actual}$ of crankshaft KW and of one of drive shafts A1, A2, and from control system 10 the respective target rotation speed $n_{VM\ setpoint}$, $n_{E1\ setpoint}$, $n_{E2\ setpoint}$; compares the target/actual pairs; and ascertains any system deviation $e_{E1}$, $e_{E2}$, $e_{VM}$, respectively.

In addition to comparison element 42, rotation speed controllers 34, 36, 38 encompass a transfer element 44 that receives from comparison element 42 any system deviations $e_{VM}$, $e_{E1}$, $e_{E2}$ that may occur; calculates on the basis of those system deviations an additional torque $M_{VM\ add}$, $M_{E1\ add}$, $M_{E2\ add}$; and delivers it as an output signal to an actuator 46 to which the corresponding target torque $M_{E1\ setpoint}$, $M_{E2\ setpoint}$, $M_{VM\ setpoint}$ is applied by control system 10. After addition of the two signals in actuator 46, the latter sets the cumulative torque $M_{E1}$, $M_{E2}$, $M_{VM}$ at the respective electric motor E1, E2 and at internal combustion engine VM. Whereas upon occurrence of a system deviation $e_{VM}$, $e_{E1}$, or $e_{E2}$ at any of units VM, E1, or E2, an additional torque $M_{VM\ add}$, $M_{E1\ add}$, $M_{E2\ add}$ calculated on the basis of that system deviation $e_{VM}$, $e_{E1}$, $e_{E2}$ is generally taken into consideration when controlling torque for that unit VM, E1, or E2 at which the system deviation $e_{VM}$, $e_{E1}$, or $e_{E2}$ had previously occurred, it is nevertheless also possible, in a kind of "state regulation system," also to calculate, based on the system deviation $e_{VM}$, $e_{E1}$, $e_{E2}$ of a unit VM, E1, E2, additional torques $M_{E1\ add}$, $M_{E2\ add}$, and $M_{VM\ add}$ for the respective other units E1, E2, and VM, which torques are then taken into consideration, in addition to the target torques $M_{E1\ setpoint}$, $M_{E2\ setpoint}$, $M_{VM\ setpoint}$ calculated by control system 10, in controlling the torque of those units E1, E2, and VM.

Rotation speed controllers 36, 38 of electric motors E1 and E2 are embodied as P controllers or PD controllers, whereas rotation speed controller 34 of internal combustion engine VM is embodied as an I, PI, or PID controller. As a result of this latter feature, the rotation speed control loop of internal combustion engine VM is provided with an integral component that compensates for inaccuracies in controlling the torque of internal combustion engine VM, so that in steady-state operation, the actual rotation speed $n_{VM\ actual}$ of internal combustion engine VM will asymptotically approach the target rotation speed $n_{VM\ setpoint}$. The system deviations $e_{E1}$ and $e_{E2}$ at electric motors E1 and E2 thus also approach zero. Electric motors E1 and E2 then establish approximately the target torques ($M_{E1}=M_{E1\ setpoint}$, $M_{E2}=M_{E2\ setpoint}$). With the target torques $M_{E1\ setpoint}$ and $M_{E2\ setpoint}$ specified by control system 10, the specification for the electrical power fed into the vehicle's electrical system is then also complied with even in the event of inaccuracies in the friction conditions of transmission 4.

Because all three units VM, E1, and E2 are operated in rotation-speed-regulated fashion, two of them can become manipulated-variable limited without causing control over the system to be lost. For example, if both electric motors E1 and E2 were to become manipulated-variable limited as a result of a overvoltage or undervoltage modulation, internal combustion engine VM will continue to maintain the rotation speed link.

The P components of rotation speed controllers 34, 36, 38 correspond, in their action, to rotation-speed-proportional mechanical dampers, and therefore counteract rotational oscillations of units VM, E1, and E2 that may occur, for example, as a consequence of torsional oscillations of two-mass flywheel 18. With the three subordinate rotation speed control loops, all three units VM, E1, and E2 contribute to active rotational oscillation damping. Whereas the torque $M_{VM}$ of internal combustion engine VM can be influenced only at the discrete ignition times, thus limiting the rotational oscillation damping by means of internal combustion engine VM to low frequencies, with electric motors in the form of three-phase motor with field-oriented regulation it is possible to achieve torque regulation times of less than 1 ms, so that in combination with suitable rotation speed sensors, higher frequencies can be damped.

What is claimed is:

1. An electromechanically power-splitting hybrid drive system for a motor vehicle that includes an internal combustion engine, a first electric motor, a second electric motor, and a transmission coupling the first electric motor and the second electric motor, the hybrid drive system comprising:
   a control system that, based on a coupling condition of the transmission, calculates respective target rotation speeds and target torques for the internal combustion engine, the first electric motor, and the second electric motor; and
   a plurality of rotation speed controllers for the internal combustion engine, the first electric motor, and the second electric motor, wherein:
   the rotation speed controllers compare the calculated target rotation speeds with the pertinent actual rotation speeds, and
   in the case of a deviation between one of the actual rotation speeds and the pertinent target rotation speed, the rotation speed controllers calculate, on the basis of the deviation, at least one additional torque that are taken into account, in addition to at least one of the target torques calculated by the control system, in controlling the torque of the internal combustion engine, the first electric motor, and the second electric motor.

2. The hybrid drive system as recited in claim 1, wherein:
   the rotation speed controller for the internal combustion engine includes one of an I controller, a PI controller, and a PID controller, and
   the rotation speed controllers of the first electric motor and the second electric motor include one of a P controller and a PD controller.

3. The hybrid drive system as recited in claim 1, wherein:
   the rotation speed controllers are in each case part of a decentralized rotation speed control loop of one of the internal combustion engine, the first electric motor, and the second electric motor.

4. The hybrid drive system as recited in claim 1, wherein:
   the rotation speed controllers do not communicate with one another.

5. The hybrid drive system as recited in claim 1, further comprising:
   a bus system via which the rotation speed controllers communicate with the control system.

6. The hybrid drive system as recited in claim 1, wherein:
the control system specifies controller parameters of at least one of: rotation speed control loops including a rotation speed control loop of the internal combustion engine, and
an initialization of an integral component of the rotation speed control loop of the internal combustion engine.

7. A method for regulating an electromechanically power-splitting hybrid drive system of a motor vehicle that includes an internal combustion engine, a first electric motor, a second electric motor, and a transmission coupling the first electric motor and the second electric motor, the method comprising:
based on coupling conditions of the transmission, calculating respective target rotation speeds and target torques for the internal combustion engine, the first electric motor, and the second electric motor;
comparing the respective target rotation speeds with corresponding actual rotation speeds of the internal combustion engine, the first electric motor, and the second electric motor;
in the case of a system deviation between one of the actual rotation speeds and the corresponding target rotation speed, calculating at least one additional torque on the basis of the system deviation, and taking into account the at least one additional torque, in addition to the target torques, in controlling the torque of the internal combustion engine, the first electric motor, and the second electric motor.

8. The method as recited in claim 7, wherein the target rotation speeds are calculated on the basis of an accelerator pedal position, an electrical power necessary for an electrical system of the motor vehicle, and actual rotation speeds of wheels of the motor vehicle or an actual rotation speed of an output shaft of the transmission.

9. The method as recited in claim 7, wherein:
the target torques contain components to compensate for inertias in the context of a dynamic operation.

* * * * *

UNITED STATES PATENT AND TRADEMARK OFFICE
CERTIFICATE OF CORRECTION

PATENT NO. : 7,668,630 B2  Page 1 of 1
APPLICATION NO. : 10/566127
DATED : February 23, 2010
INVENTOR(S) : Weber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Seventh Day of December, 2010

David J. Kappos
*Director of the United States Patent and Trademark Office*